United States Patent [19]

Ishizuki et al.

[11] Patent Number: 4,457,606
[45] Date of Patent: Jul. 3, 1984

[54] MOTOR DRIVE UNIT FOR CAMERA

[75] Inventors: Kenji Ishizuki, Tokyo; Sakuji Watanabe, Warabi; Koichi Daitoku, Sagamihara, all of Japan

[73] Assignee: Nippon Kogaku K.K., Tokyo, Japan

[21] Appl. No.: 460,834

[22] Filed: Jan. 25, 1983

[30] Foreign Application Priority Data

Feb. 1, 1982 [JP] Japan ................................ 57-13333

[51] Int. Cl.³ .............................................. G03B 1/18
[52] U.S. Cl. .............................................. 354/173.11
[58] Field of Search ........................ 354/173.1, 173.11

[56] References Cited

U.S. PATENT DOCUMENTS 4,362,371 12/1982 Watanabe et al. ................ 354/173.1
4,363,544 12/1982 Nemoto et al. .................. 354/173.11

*Primary Examiner*—William B. Perkey
*Attorney, Agent, or Firm*—Fitzpatrick, Cella, Harper & Scinto

[57] ABSTRACT

A motor drive unit capable of being coupled to a camera by being mounted on the camera to drive the film, advance device of the camera after completion of exposure of a film the camera having means producing a signal for transmitting the completion of exposure, includes means provided to identify the type of the camera in response to the mounting of the motor drive unit onto the camera, means producing a drive signal for driving the film advance device in response to the signal for transmitting the completion of exposure, the drive signal producing means including means for adjusting the time of production of the drive signal in response to the identifying means, and drive means including a drive source and capable of being coupled to the film advance device by the motor drive unit being mounted on the camera, the drive means being responsive to the drive signal to drive the film advance device.

10 Claims, 3 Drawing Figures

MOTOR DRIVE UNIT FOR CAMERA

BACKGROUND OF THE INVENTION

1. Field of the Invention

This invention relates to a continuous photography system, and more particularly to a motor drive unit which cooperates with a photographic camera to enable continuous photography.

2. Description of the Prior Art

So-called motor drive units which, by being mounted on a camera, detect the wind-up starting signal on the camera side after shutter release and automatically wind up the film are known. Also, along with the recent systematization of cameras, a motor drive unit usable in common with a plurality of types of cameras has been put into practical use. Where such motor drive unit is used with a plurality of types of cameras, the following problems arise.

A first problem is as follows.

Where a camera containing a flash unit therein is operated for continuous photography by the motor drive unit, it is necessary to provide photographing intervals of a predetermined value or greater, that is, to keep the frame speed (the number of frames photographed per unit time) of continuous photography below a predetermined value, relative to the flashlight emission preparation time, and more specifically the charging time of the main capacitor thereof. The frame speed differs depending on the time lag from completion of exposure until initiation of wind-up, the time lag from completion of wind-up until initiation of release and the power of the wind-up motor itself. In any case, however, in a motor drive unit capable of being mounted on a camera in which the photographing frame speed must be kept low, as in a camera containing a flash unit therein; and a camera in which the photographing frame speed need not be kept low, if the frame speed is adjusted to the former camera, it will become a low speed unnecessary to the latter camera and in the converse case, when the motor drive unit is mounted on the former camera, proper photography will become impossible.

Here, referring for example to the time lag from completion of exposure until initiation of wind-up, the wind-up starting signal on the camera side for operating the motor drive unit is produced by operating a switch by the operation of the rearward shutter curtain or, in the case of a single lens reflex camera, by the downward movement of the mirror after completion of exposure, and there is a time lag until actually film advance operation actually becomes possible after such signal has been produced. Thus, in anticipation of such time lag, it is necessary to provide in the motor drive unit a delay circuit which produces a certain delay time.

However, where it is desired to use such motor drive unit with other types of camera, if means producing the wind-up starting signal and the operating time of the rearward shutter curtain or the mirror differ from camera to camera, the time required from the production of the wind-up starting signal until completion of the photographing operation will also necessarily differ. Where there is a difference in length between time lags, the delay circuit must be adjusted to a camera having a longer time lag. In that case, a camera having a shorter time lag will have a useless delay time corresponding thereto and if an attempt is made to effect continuous photography with such camera combined with the motor drive unit, the frame speed during the continuous photography will be checked to an unnecessarily low value.

To overcome such demerit, it would occur to mind to set all cameras capable of using the same motor drive unit to the same time lag. However, this would remarkably hamper the degree of freedom of design of both the wind-up starting signal producing system and the subsequent operating system, and it is not desirable.

SUMMARY OF THE INVENTION

It is an object of the present invention to provide a motor drive unit having interchangeability with respect to plurality of different types of cameras by its driving performance being adjusted inconformity with the ability of the camera with which it is to be combined.

It is another object of the present invention to provide a continuous phototgraphy system more rationalized by being provided with the above-described motor drive unit.

It is still another object of the present invention to provide a motor drive unit which can detect the type of a camera by the mounting operation of the device onto the camera body and vary the frame speed of continuous photography in accordance with the type of the camera.

The invention will become fully apparent from the following detailed description thereof taken in conjunction with the accompanying drawings.

DESCRIPTION OF THE PREFERRED EMBODIMENTS

Figure 1:
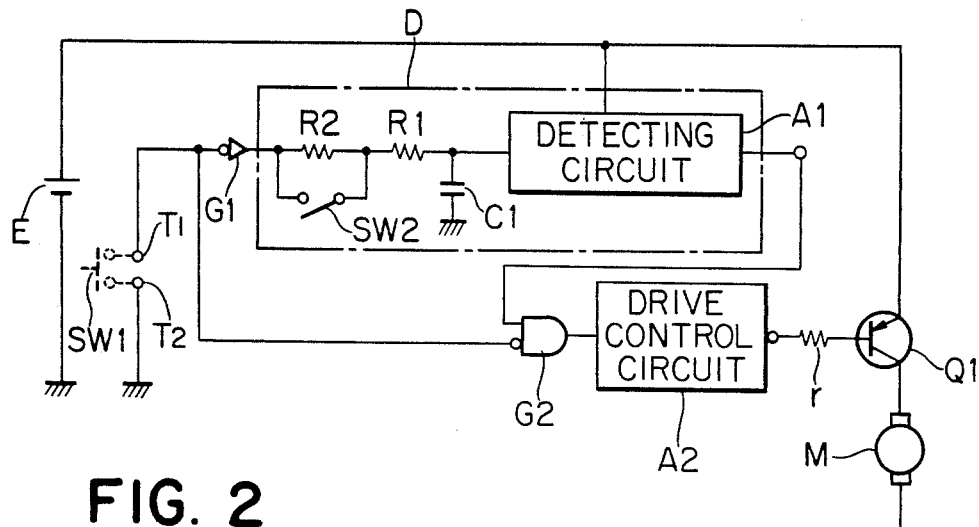
FIG. 1 is a diagram of the electric circuit of a motor drive unit according to an embodiment of the present invention.

In FIG. 1, a wind-up signal producing switch $SW_1$ provided in a camera body, is closed to close the circuit between terminals $T_1$ and $T_2$ after completion of exposure, and is opened to open the circuit between terminals $T_1$ and $T_2$ upon completion of wind-up. An inverter $G_1$ puts out an "H" output when the swithch $SW_1$ is closed, and puts an "L" output when the switch $SW_1$ is open.

A delay circuit D includes series-connected resistors $R_1$ and $R_2$, a switch $SW_2$ connected in series with the resistor $R_2$, a capacitor C and a voltage detecting circuit $A_1$. The output of the detecting circuit $A_1$ and the logic signal provided by ON-OFF of the switch $SW_1$ are input to an AND gate $G_2$ and a drive signal is put out to a motor drive control circuit $A_2$. The output of this drive control circuit $A_2$ may be input to the base of a PNP type transistor $Q_1$ through a resistor r, the emitter of the transistor $Q_1$ being connected to a power source E and the collector thereof being connected to the positive terminal of a motor M.

Figure 2:
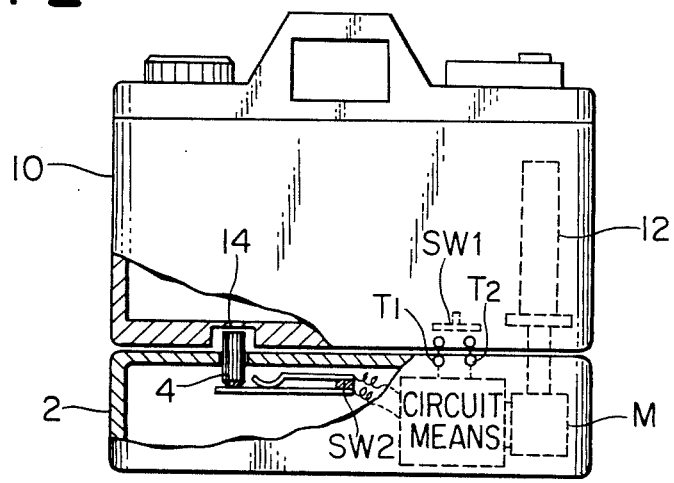
FIG. 2 is a partly cross-sectional view showing the motor drive unit of FIG. 1 as mounted on a first camera body.

A motor drive unit, as shown in FIG. 2, is provided with a housing 2 fitting the bottom surface of the camera body 10, and with the circuit means of FIG. 1, a connector for electrically connecting the terminals $T_1$ and $T_2$ to the switch $SW_1$ of the camera body and a coupling for transmitting the rotation of the motor M to the film advance spool 12 of the camera body are provided in the housing 2. One of the contact pieces of the switch $SW_2$ of the delay circuit D is in contact with the tip end of a pin 4 retractably projected from a wall surface of the housing 2 opposed to the camera body, and the resilient force of said contact piece acts to cause the pin 4 to project from the wall surface.

The first camera body 10 shown in FIG. 2 has a characteristic that the time lag from after a wind-up starting signal has been produced until the film advance operation actually becomes possible is relatively small, and the bottom surface thereof is formed with a depression 14 deeper than the amount of projection of the pin 4 of the motor drive unit, the depression 14 being located at a position corresponding to the pin 4.

When the motor drive unit 2 is mounted on the first camera body 10, the pin 4 enters deeply into the depression 14 of the camera body and keeps that position, so that the switch $SW_2$ remains closed. Thereupon, the resistor $R_2$ is short-circuited and therefore, when the switch $SW_1$ is closed in synchronism with completion of exposure, the output of the inverter $G_1$ becomes "H" and, when the charging voltage of the capacitor $C_1$ reaches a threshold voltage at a time constant determined by the resistor $R_1$ and the capacitor $C_1$, the voltage detecting circuit $A_1$ operates to render one input of the AND gate $G_2$ into "H" level. At this point of time, the switch $SW_1$ remains closed and therefore, the other input of the gate $G_2$ is "H". Accordingly, the output of the AND gate $G_2$ becomes "H" and closes the motor drive control circuit $A_2$ to cause the output thereof to produce "L" level. When the output of the drive control circuit $A_2$ thus becomes "L", the base current of the transistor $Q_1$ flows and at the same time, the collector current thereof also flows, whereby the motor M starts to drive. Thus, film advance takes place through a wind-up coupling. When the film advance of one frame and shutter charge are achieved, the circuit $A_2$ stops driving the motor. While the release button of the camera is being depressed, such operation is repeated and continuous photography is achieved. The number of frames photographed per unit time in this case is optimum for this camera.

Figure 3:
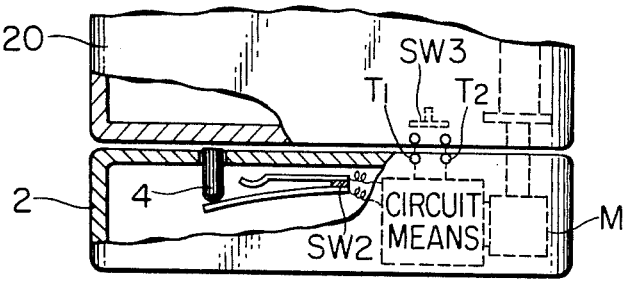
FIG. 3 is a partly cross-sectional view showing the motor drive unit of FIG. 1 as mounted on a second camera body.

FIG. 3 shows the motor drive unit 2 as mounted on a second camera body 20. The second camera body 20 has a characteristic that the time lag after the wind-up starting signal has been produced until film advanced operation actually becomes possible is relatively great, and the bottom surface thereof is not formed with a depression correspoding to the pin 4. Accordingly, the difference in characteristic of the second camera body 20 from the first camera body 10 is transmitted as the presence of a depression to the motor drive unit through the pin 4.

When the motor drive unit 2 is mounted on the second camera body 20, the pin 4 is pushed and retracted by the bottom surface of the camera body 20 to thereby open switch $SW_2$. Accordingly, the delay circuit D has its delay time increased because the delay time from the closing of a switch $SW_3$ synchronized with completion of exposure until the detecting circuit $A_1$ produces an output is determined by the sum $(R_1+R_2)$ of the resistance values of the resistors $R_1$ and $R_2$ and the value of the capacitor $C_1$, and the number of frames exposed per unit time controlled by the motor drive unit in accordance with the characteristic of this camera becomes small.

As modification of the above-described embodiment, it is possible to provide two or more sets of combinations of resistor $R_2$ and switch $SW_2$ to thereby create different delay times, thereby enabling the motor drive unit to be mounted on three or more different camera bodies. Different delay times can also be created by combinations of plural capacitors instead of the resistor and plural switches. Of course, the delay time can be selected to a desired length by changing the resistance values of the individual resistors and/or changing the capacity of the capacitor.

As previously described, the frame speed differs depending on the time lag from completion of exposure until start of wind-up and in addition, depending on the time lag from completion of wind-up until start of shutter release or the power of the wind-up motor itself and therefore, to change the frame speed, these factors may also be changed. In any case, according to the present invention described hitherto, the type of the camera may be detected by the mounting of the motor drive unit onto that camera and on the basis of the result, the frame speed of continuous photography may be varied, and this leads to the possibility of effecting continuous photography at a frame speed optimum for each camera.

We claim:

1. A motor drive unit capable of being coupled to a camera by being mounted on said camera to drive the film advance device of the camera after completion of exposure, said motor drive unit comprising:
   (a) means provided to identify the type of said camera in response to the mounting of said motor drive funit onto said camera;
   (b) means producing a drive signal for driving said film advance device in response to said signal for transmitting said completion of exposure, said drive signal producing means including means for adjusting the time of production of said drive signal in response to said identifying means; and
   (c) drive means including a drive source and capable of being coupled to said film advance device by said motor drive unit being mounted on said camera, said drive means being responsive to said drive signal to drive said film advance device.

2. A motor drive unit according to claim 1, wherein said adjusting means includes timer means whose count time is variable to adjust the time from said completion of exposure until the initiation of said film advance.

3. A motor drive unit according to claim 2, wherein said identifying means includes switch means operable by said camera when said motor drive unit is mounted onto said camera, and said timer means includes a timer circuit whose time constant is selected by said switch means.

4. A motor drive unit capable of being coupled to a camera by being mounted on said camera, and cooperating with said camera to enable a continuous photographing operation including the operation of winding up the film advance device of the camera in response to a command signal from said camera for instructing initiation of wind-up, said motor drive unit comprising:
   (a) means provided to identify the type of said camera in response to the mounting of said motor drive unit onto said camera; and
   (b) means for adjusting the time required from after reception of said command signal until completion of the wind-up of said film advance device so as to match the type of said camera identified by said identifying means.

5. A motor drive unit according to claim 4, wherein said adjusting means includes means producing a drive signal for initiating the wind-up of said film advance device after lapse of a predetermined time from after reception of said command signal, and said motor drive unit further comprises means capable of being coupled to said film advance device by said motor drive unit being mounted on said camera and responsive to said drive signal to drive said film advance device.

6. A motor drive unit according to claim 5, wherein said adjusting means includes time counting means operable in response to said identifying means to change said predetermined time which determines the time of production of said drive signal.

7. A motor drive camera system comprising:
 (a) a camera body provided with an inherent index representative of the type of said camera body, said camera body having film exposure means, film advance means and means producing a wind-up signal for instructing initiation of the advance of film with the exposure of the film; and
 (b) a motor drive unit capable of being coupled to said camera body by being mounted on said camera body, said motor drive unit including means for detecting said inherent index in response to the mounting thereof onto said camera body, drive means capable of driving said film advance means of said camera body by being coupled to said film advance means, means for actuating said drive means in response to said wind-up signal, and means for adjusting the time of actuation of said drive means by said actuating means in accordance with said inherent index detected by said detecting means.

8. The camera system according to claim 7, further comprising coupling means coupled to each other with the mounting of said motor drive unit onto said camera body, said coupling means having first coupling means for electrically coupling said wind-up signal producing means and said actuating means, second coupling means for mechanically coupling said film advance means and said drive means, and third coupling means for coupling said index of said camera body and said detecting means.

9. The camera system according to claim 7, wherein said camera body said motor drive unit have housings coupled by surfaces fitting to each other, and said index and said detecting means are provided on said fitting surfaces of the corresponding housings.

10. The camera system according to claim 9, wherein said index has a depression formed in the housing of said camera body, and said detecting means has a projected pin slidably held by the housing of said motor drive unit at the corresponding position of said housing and capable of being fitted into said depression, and switch means operated by sliding movement of said projected pin.

* * * * *

UNITED STATES PATENT AND TRADEMARK OFFICE
CERTIFICATE OF CORRECTION

PATENT NO. : 4,457,606

DATED : July 3, 1984

INVENTOR(S) : KENJI ISHIZUKI, ET AL.

It is certified that error appears in the above-identified patent and that said Letters Patent is hereby corrected as shown below:

Column 1, line 51, delete "actually".

Column 2, line 14, after "to" insert --a--;

line 15, change "inconformity" to --in conformity--;

line 50, change "swithch" to --switch--.

Column 3, line 49, after "lag" insert --from--;

line 50, change "advanced" to --advance--;

line 53, change "correspoding" to --corresponding--

Column 4, line 32, after "exposure" insert --of a film, said camera having means producing a signal for transmitting said completion of exposure--;

line 35, change "funit" to --unit--.

Column 6, line 19, after "body" insert --and--.

Signed and Sealed this

Twenty-third Day of October 1984

[SEAL]

Attest:

GERALD J. MOSSINGHOFF

Attesting Officer     Commissioner of Patents and Trademarks